United States Patent [19]

Smith

[11] 4,333,632

[45] Jun. 8, 1982

[54] LIP SEAL

[75] Inventor: Russell G. Smith, Cincinnati, Ohio

[73] Assignee: Xomox Corporation, Cincinnati, Ohio

[21] Appl. No.: 223,126

[22] Filed: Jan. 7, 1981

[51] Int. Cl.³ .............................................. F16K 5/02
[52] U.S. Cl. .................................... 251/214; 251/309;
251/335 A
[58] Field of Search ................... 251/214, 309, 335 A,
251/317, 331, 312

[56] References Cited

U.S. PATENT DOCUMENTS

| | | | |
|---|---|---|---|
| 3,506,239 | 4/1970 | Johnson | 251/214 |
| 3,508,573 | 4/1970 | Smith | 251/309 |
| 3,540,740 | 11/1970 | Smith | 251/214 |
| 3,709,910 | 11/1972 | Smith | 251/309 |
| 4,159,818 | 7/1979 | Hoos | 251/214 |

OTHER PUBLICATIONS

Duriron Bulletin V-24, 9/1972, regarding Sleeveline Valves.

Primary Examiner—H. Jay Spiegel
Attorney, Agent, or Firm—Kinney & Schenk

[57] ABSTRACT

A plug valve is provided with primary, secondary and tertiary seals. The primary seal includes an apertured sleeve which envelopes a plug portion of a valving member. The secondary and tertiary seals are provided by a delta ring and a lip of a diaphragm respectfully. The diaphragm is formed with a hollow annular groove proximal to the stem portion of the valving member. The delta ring is placed in this hollow annular groove with an interference fit to form a secondary seal between itself and the valving member and to augment the tertiary seal formed between a lip of the diaphragm and the valving member.

5 Claims, 6 Drawing Figures

LIP SEAL

BACKGROUND OF THE INVENTION

There has been considerable activity within recent years toward the development of leak-proof valves for controlling flow of corrosive fluids under high pressures and temperatures. In designing a valve for this purpose, it is important not only to provide an effective seal, but also to offer minimal resistance to valve rotation.

Since a greater number of process lines are used for high pressure fluids rather than vacuums, a correspondingly greater amount of attention has been devoted to providing effective seals for valves in high pressures lines. Consequently, many widely used valves today are relatively ineffective when used in a high vacuum application.

A plug valve has a plug portion which is rotatably fitted within a valve body. The plug portion of the valve is joined by a stem or shaft portion which extends out of the valve body to interact with an actuator and transmit torque to the plug portion. This torque is used to rotate the plug portion within the valve body and move a passageway through the plug portion of the valve in and out of registry with a flow passage extending through the valve body.

A number of different types of top seals have been used in the past to seal the rotary stem or shaft of the valve exterior. In one highly successful approach, a delta ring bearing has been circumscribed about the stem or shaft with an interference fit. A diaphragm with a central opening for the stem or shaft has been fitted about the stem in overlaying relationship to the delta ring. This type of arrangement is illustrated in U.S. Pat. No. 3,703,910 to Smith.

Another successful top seal uses a diaphragm with a reverse lip which engages and extends along the stem's periphery. In this sealing arrangement, the diaphragm has a central opening through which the stem extends. The radial intermost portion of the diaphragm in engagement with the stem is folded so as to orient the internal periphery of the opening to extend axially along the stem. In this arrangement, the opening in the diaphragm for the stem is in substantially perpendicular relationship to the outer and intermediate portions of the diaphragm.

The second mentioned seal discussed above, is not satisfactory for vacuum service as vacuum within the valve tends to collapse the diaphragm, pulling it away from the stem and diminishing the sealing relationship thereto.

Applicant has developed a seal which is similar in many respects to both of the seals discussed above, but which makes important improvements which greatly enhance the sealing capabilities. The seal of the present application is highly effective in either positive or negative pressure situations.

Accordingly, it is an object of the present invention to provide a seal for a plug valve which is highly effective in both pressure and vacuum applications.

It is another object of the present invention to provide a seal for a plug valve which offers minimal resistance to valve rotation while sealing against both positive and negative pressure differentials.

These and other objects and advantages of the invention will be more readily apparent upon reading the following detailed description and upon reference to the accompanying drawings.

SUMMARY OF THE INVENTION

In accordance with the invention, a valve having an internal flow passage extending therethrough is provided with a valving member rotatably fitted in the valve body for controlling fluid flow through the internal flow passage. The valving member is rotatable about an axis and has a plug portion interposed in the internal flow passage which is selectively movable in and out of registry with that internal flow passage in accordance with the valving members rotational position with respect to the valve body. The valving member has a shaft portion joined to the plug portion for transmitting torque to the plug portion from a location remote therefrom and includes a shoulder intermediate of the shaft and plug portions. A diaphragm is fitted to the valve body with its central opening through which the shaft portion of the valving member extends. The diaphragm has a hollow groove of predetermined cross sectional shape proximal to the central opening. This hollow groove has sidewalls which extend in the direction of the rotational axis and engage the stem portion of the valving member with an interference fit. A circular seal is fitted within the hollow groove which has a cross sectional configuration matching that of the groove. The circular seal bears against and is in sealing relationship to the shoulder and is operative to radially urge the sidewalls of the groove in the diaphragm against the stem portion of the valving member. The hollow groove in the diaphragm preferably has a triangular shape with the circular seal being a delta ring with a matching triangular cross sectional configuration. The diaphragm and the delta ring are both preferably formed of a fluorinated hydrocarbon polymeric material. In the preferred embodiment, a metal diaphragm is positioned against the diaphragm of fluorinated hydrocarbon polymeric material on the side opposite the plug portion. This metal diaphragm extends radially inward toward the axis of rotation to the outer periphery of the hollow groove.

BRIEF DESCRIPTION OF THE DRAWINGS

Other objects and advantages of the invention will become apparent upon reading the following detailed description and upon reference to the drawings, in which:

FIG. 3 is a cross sectional view of a metal diaphragm used in the embodiment of FIG. 1.

While the invention will be described in connection with the preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
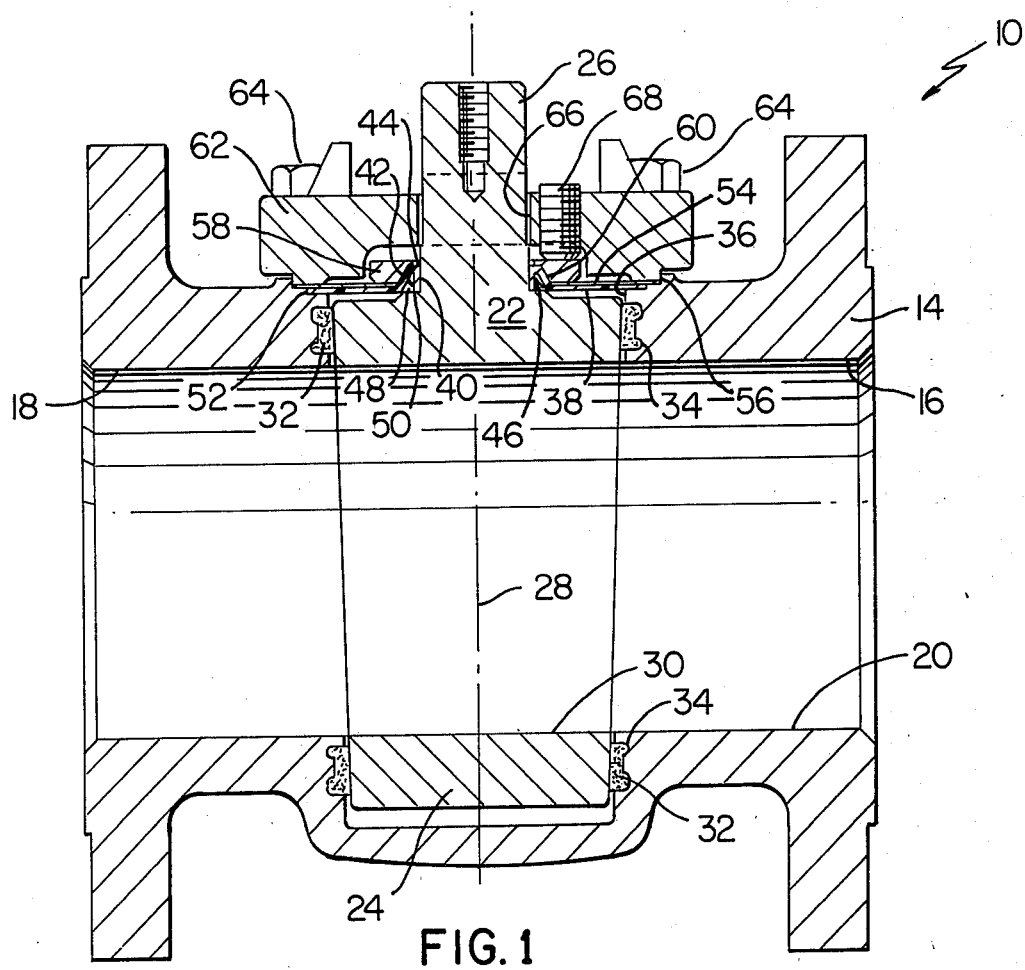
FIG. 1 is an elevational view, partially in cross section, of a plug valve and seal made in accordance with the present invention.

Referring now to the drawings and to FIG. 1 in particular, a plug valve 10 constructed in accordance with the present invention is shown. The plug valve 10 includes a valve body 14 having an inlet 16 and an outlet 18 with an internal flow passage 20 extending therebetween. A valving member 22 extends across the internal flow passage 20 to selectively block fluid flow therethrough. This valving member 22 is rotatably disposed within the valve body 14 of the illustrated embodiment and has a plug portion 24 which extends across the flow passage 20. A stem portion 26 of the valving member 22 is integrally attached to the plug portion 24 to extend out of the valve body 14. Under normal circumstances, this stem portion 26 is interconnected with an actuator (either manual or automatic) which transmits a torque to the valving member 22 to effectuate relative rotation of the valving member 22 relative to the valve body 14 along a rotational axis 28.

The plug portion 24 of the valving member 22 has a through opening or passageway 30 therein, as is usual, to be placed in and out of registry with the internal flow passage 20 incident to partial rotation of the valving member 22 about the axis 28. In the illustration of FIG. 1, the valving member 22 is shown in an open position. In this open position, the passageway 30 through the plug portion 24 registers with the internal flow passage 20. As should be readily apparent, the valving member 22 is designed to be rotated about its axis 28 to place its through passageway 30 out of registry with the valve housing's (14) internal flow passage 20 and to completely cut off flow through that internal flow passage 20.

A first or primary sealing member in the form of a sleeve or liner 32 formed of a fluorinated hydrocarbon polymeric material such as polytetrafluoroethylene, sold under the Trademark TEFLON or equivalent material is preferably fitted about the periphery of the plug portion 24 of the valving member 22 and is apertured in correspondency to that plug portion 24 to permit registry of the plug portion's (24) through passageway 30 with the internal flow passage 20 whenever the valving member 22 is in the open position illustrated. The sealing member 32 is snugly fitted in circular grooves 34 on opposite sides of the internal flow passage 20 and provides a seal between the plug portion 24 of the valving member 22 and the valve body 14.

Figure 4:
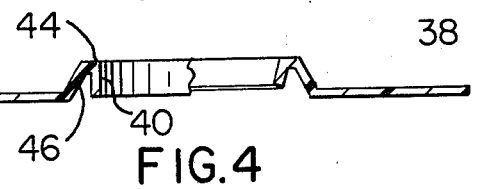
FIG. 4 is a cross sectional view of a fluorinated hydrocarbon polymeric diaphragm with the left hand portion shown as it would appear after assembly in the embodiment of FIG. 1 and the right hand portion shown as it would appear in the free state.

As mentioned above, the stem or shaft portion 26 of the valving member 22 extends out of the valve body 14. In the illustration of FIG. 1, this extension is through an opening 36 in the top of the valve body 14, and, for purposes of the present description, this opening will be referred to as a top opening 36 (although the valve could clearly be oriented differently). This top opening 36 is covered with a plastic diaphragm 38 which is centrally apertured to accommodate the stem portion of the valving member 22 which passes through the plastic diaphragm 38. The plastic diaphragm 38 is preferably formed of a fluorinated hydrocarbon polymer such as polytetrafluoroethylene or equivalent material and is formed with a pressure and memory actuated lip seal 40 which is intimately fitted against the stem portion 26 of the valving member 22. The plastic diaphragm 38, while flexible, is generally planar along its radially outer and intermediate portions. In it's radial interior portion, proximal to the stem portion 26 of the valving member 22, the plastic diaphragm 38 is obliquely oriented (at 42) from the plane in which the radial outermost and intermediate portions of the diaphragm are situated, toward the outermost portion of the stem 26. As this obliquely oriented portion 42 approaches the stem portion 26 of the valving member 22, it is angled sharply downwardly (at 44) in the direction of the valving member's rotational axis 28 to sealingly engage the stem portion 26. This orientation of the inner portion of the plastic diaphragm 38 provides a hollow annular groove 46 of triangular cross sectional configuration. This annular groove 46 is perhaps shown best in the depiction of FIG. 4. The FIG. 4 depiction also shows the manner in which the plastic diaphragm 38 is distorted from its free state during assembly, the right hand portion of FIG. 4 showing the free state with the left hand portion showing the deflected state the diaphragm takes after it is engaged with the stem portion 26 of the valving member 22 during assembly.

Figure 5:
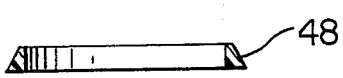
FIG. 5 is a cross sectional view of a delta ring used in the embodiment of FIG. 1.
Figure 6:
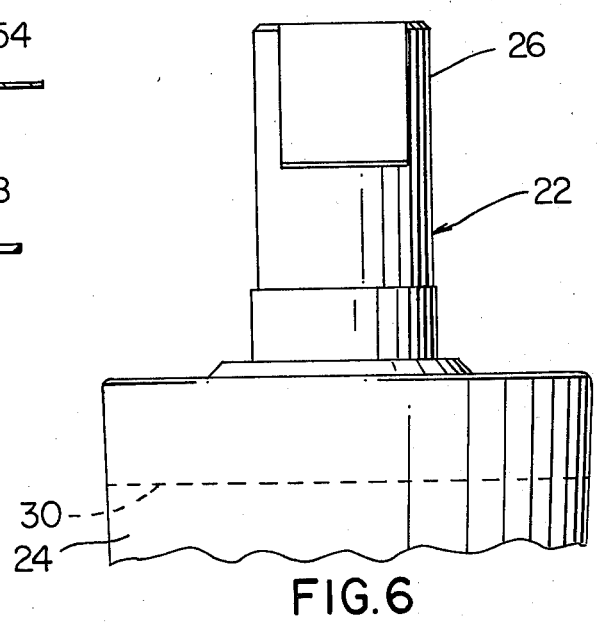
FIG. 6 is a fragmentary elevational view of a portion of a valving member used in the embodiment of FIG. 1.

The hollow triangular annular groove 46 formed proximal to the stem portion 26 of the valving member 22 is filled with a delta ring 48 of matching cross sectional configuration. This delta ring, which is shown in isolation in FIG. 5, is preferably formed of a fluorinated hydrocarbon polymeric material such as polytetrafluoroethylene and is shown assembled in FIG. 1. This delta ring, like lip 40 formed by the plastic diaphragm 38, circumscribes the stem portion 26 of the valving member 22. It is fitted to the plastic diaphragm 38 with an interference fit. The delta ring 48 is seated upon a shoulder 50 intermediately positioned on the valving member 22 with respect to the stem 26 and plug 24 portions. The delta ring 48 thus bears against the shoulder 50 to form a fluid seal. It is thus seen that, in addition to the primary seal provided by the sleeve 32 which circumscribes the plug portion 24 of the valving member 22, secondary tertiary seals are provided. This secondary seal is provided by the delta ring 48 bearing upon the shoulder 50. The interference fit of the delta ring 48 insures sealing engagement of the lip seal 40 and provides effective sealing on vacuum service. The delta ring 48 prevents the lip seal 40 from being pulled away from the vacuum, service like many of the prior art seals. The tertiary seal is provided at the shank or stem portion 26 of the valving member 22 by the plastic diaphragm 38. This plastic diaphragm 38 is preformed with the pressure and memory actuated lip seal 40 for circumscribing the stem portion 26. The outer periphery of this plastic diaphragm is nested in a first counterbore 52 of the valve body, as shown in FIG. 1.

Figure 2:
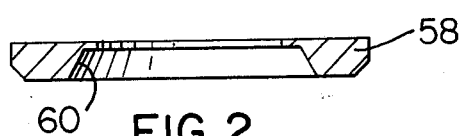
FIG. 2 is a cross sectional view of the thrust collar used in the embodiment of FIG. 1.

A second diaphragm 54 formed of metal is fitted over the plastic diaphragm 38. This metal diaphragm 54 extends radially inward from a second counterbore 56 in the valve body 14 to the annular hollow groove 46 formed in the plastic diaphragm 38. This metal diaphragm 54 is compressingly engaged by a floating thrust collar 58 (shown in isolation in FIG. 2) which circumscribes the periphery of the hollow annular groove 46 formed by the plastic diaphragm 38. The interior annular surface 60 of the thrust collar is obliquely oriented toward the stem portion 26 of the valving member 22 in parallel relationship with the obliquely oriented surface 42 of the plastic diaphragm 38. When the thrust collar 58 is compressingly fitted against the metal diaphragm 54, the inner sidewalls 60 of the thrust collar 58 firmly engage the parallel sidewalls 42 of the plastic diaphragm 38. The metal diaphragm 54 provides a metal to metal seal with the thrust collar 58 and prevents excessive cold flow and destruction of the plastic diaphragm 38 if the thrust collar 50 is tightened excessively.

A valve cover 62 is securely fitted to the valve body 54 to cover the top opening 36 with the aid of suitable fastening elements specifically illustrated as bolts 64. The valve cover 62 has a central opening 66 through which the stem portion 26 of the valving member 22 extends. Additionally, the valve cover 62 of the preferred embodiment has three adjustable screws 68 (only one of which is illustrated) tapped therein for engaging the thrust collar 58. These three adjustable screws 68 are uniformly positioned about the valving member's rotational axis by equal annular spacings and may be used to apply uniform pressure on the secondary and tertiary sealing surfaces of the valve provided by the plastic diaphragm 38 and the delta ring 48.

This it is apparent that there has been provided, in accordance with the invention, a valve that fully satisfies the objects, aims and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A valve with an improved top seal, comprising:
   (a) a valve body having an internal flow passage extending therethrough;
   (b) a valving member rotatably fitted in said valve body for controlling fluid flow through the internal flow passage, said valving member being rotatable about an axis and having a plug portion interposed in said internal flow passage with a passageway which is selectively movable in and out of registry with said internal flow passage in accordance with the valving member rotational position with respect to said valve body, said valving member having a shaft portion joined to said plug portion for transmitting torque to said plug portion from a location remote from said plug portion and a shoulder on said valving member intermediate said shaft and plug portion;
   (c) a diaphragm sealingly fitted to said valve body and having a central opening through which said shaft portion of said valving member extends, said diaphragm having a hollow groove of predetermined cross-sectional shape proximal to said central opening, said hollow groove having sidewalls extending in the direction of said axis said sidewalls being convergent in a direction toward said remote location with one of the sidewalls engaging said stem portion of the valving member; and
   (d) a circular seal fitted within said hollow groove and having a cross-sectional configuration matching that of the groove, said circular seal bearing against and in sealing relationship to said shoulder and being operative to radially urge said sidewalls of said one of the groove in said diaphragm against said stem portion of the valving member.

2. A valve as recited in claim 1 wherein said hollow groove has a triangular shape and said circular seal is a delta ring with a matching triangular cross-sectional configuration.

3. A valve as recited in claim 2 wherein said diaphragm and said delta ring are formed of a fluorinated hydrocarbon polymeric material.

4. A valve as recited in claim 3 further including a metal diaphragm positioned against said diaphragm of fluorinated hydrocarbon polymeric material on the side opposite said plug portion, said metal diaphragm extending radially inward toward said axis to the outer periphery of said hollow groove.

5. A valve as recited in claim 1 wherein the diaphragm sidewall engaging the stem portion is deflected by engagement with the stem portion from a free state in which it is obliquely orientated with respect to the stem portion.

* * * * *